June 24, 1930.  C. V. LAPIN  1,766,390
AIRCRAFT
Filed Dec. 3, 1928  4 Sheets-Sheet 1

INVENTOR.
Charles V. Lapin
BY Nunn & Co.
ATTORNEYS.

June 24, 1930.  C. V. LAPIN  1,766,390
AIRCRAFT
Filed Dec. 3, 1928   4 Sheets-Sheet 2
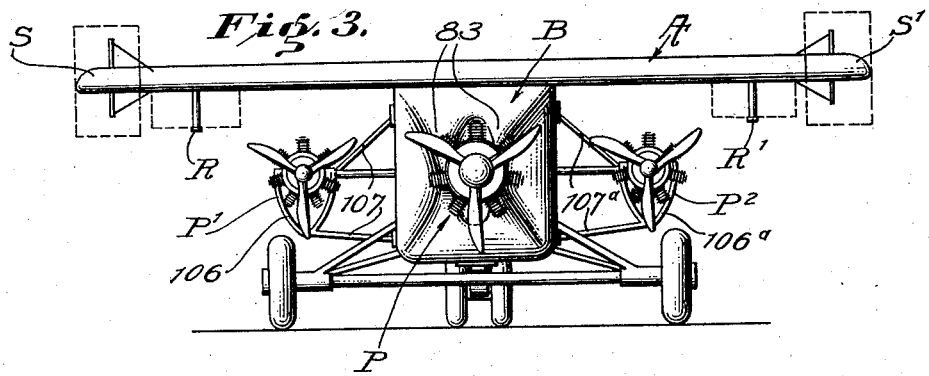
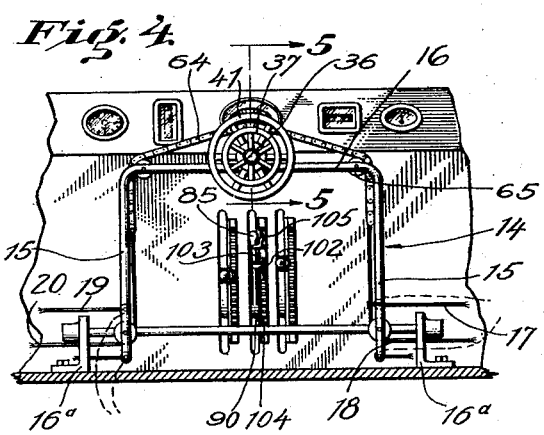
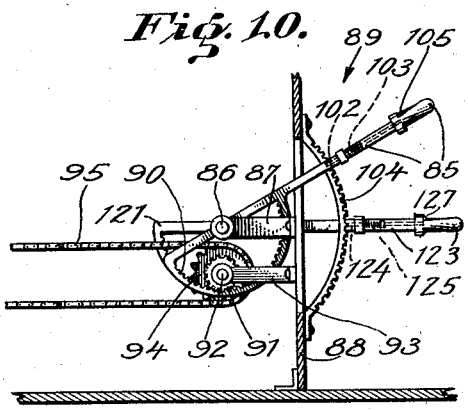
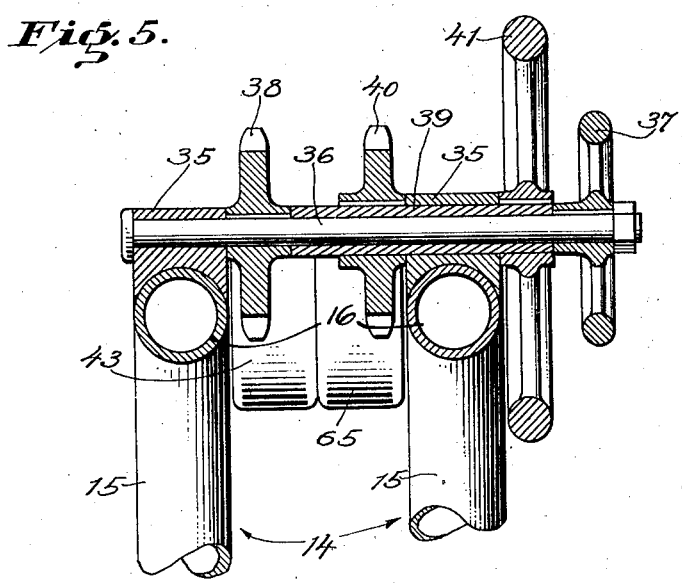
INVENTOR.
Charles V. Lapin
BY
ATTORNEYS.

June 24, 1930.  C. V. LAPIN  1,766,390
AIRCRAFT
Filed Dec. 3, 1928   4 Sheets-Sheet 3
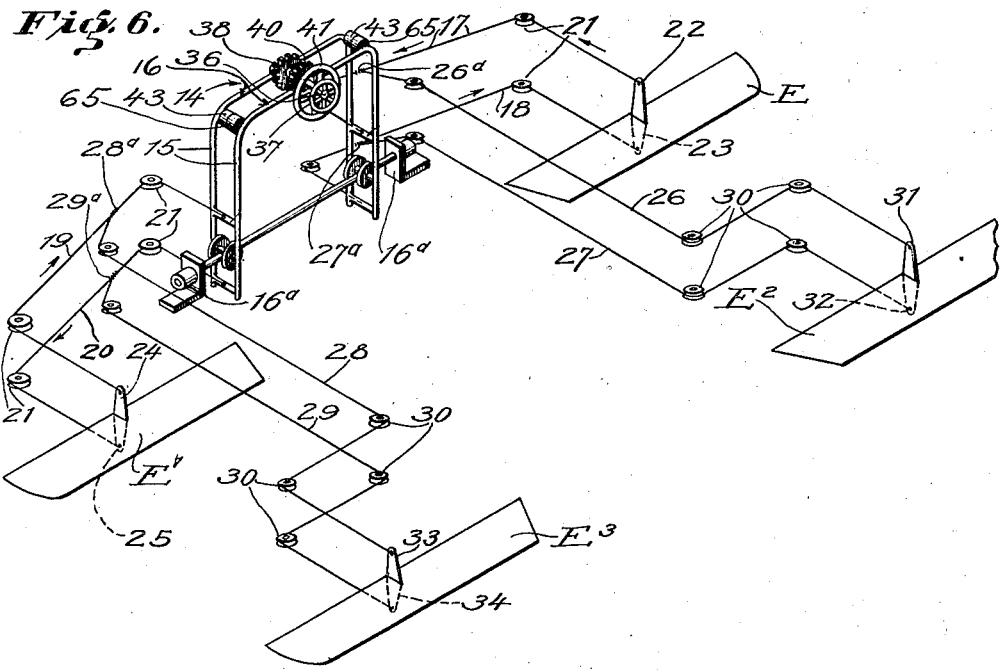
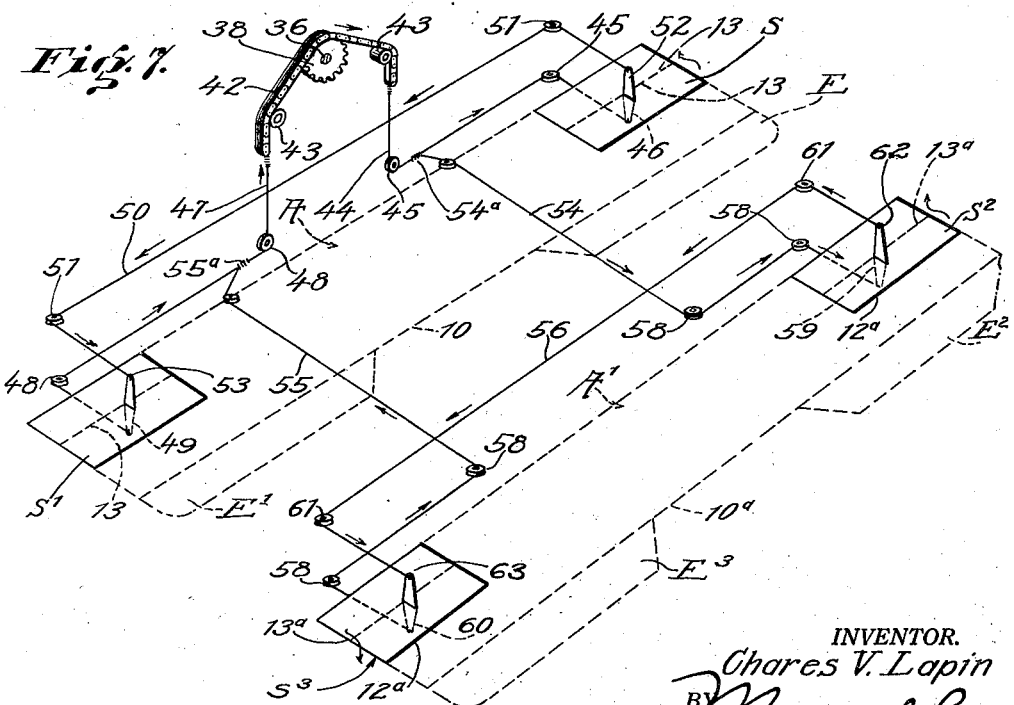
INVENTOR.
Charles V. Lapin
BY Munn & Co.
ATTORNEYS.

June 24, 1930.  C. V. LAPIN  1,766,390
AIRCRAFT
Filed Dec. 3, 1928  4 Sheets-Sheet 4

INVENTOR.
Charles V. Lapin
BY
ATTORNEYS.

Patented June 24, 1930

1,766,390

UNITED STATES PATENT OFFICE

CHARLES V. LAPIN, OF LOS ANGELES, CALIFORNIA

AIRCRAFT

Application filed December 3, 1928. Serial No. 323,343.

My invention relates to and has for a purpose the provision of a heavier-than-air craft having an arrangement of supporting surfaces or aerofoils and of flying control surfaces, by which the usual form of tail assembly of a conventional airplane can be dispensed with, and yet the craft maneuvered and maintained on a desired course with the utmost ease and under perfect control of the operator, as well as rendering the craft inherently stable and self supporting in the air to such extent as to eliminate the possibility of a tail spin or nose dive, and enabling the craft to function as a glider in the event that operation of the propelling means of the craft is discontinued, so that the craft can be readily maintained under control.

It is a further purpose of my invention to provide an aircraft embodying means by which the direction of thrust of the propelling means of the craft can be varied to such extent as to cause the craft to be propelled in either a forward direction, a combined forward and upward direction, or a vertically upward direction so that relatively high forward speeds of the craft can be obtained yet the craft rendered capable of hovering or cruising slowly over an area as well as taking off from or landing in a restricted space.

I will describe only one form of aircraft embodying my invention, and will then point out the novel features thereof in claims.

In the accompanying drawings

Fig. 3 is a view of the aircraft in front elevation;

Fig. 4 is a transverse vertical sectional view taken on the line 4—4 of Fig. 2 and looking in the direction of the arrows;

Fig. 5 is an enlarged fragmentary sectional view taken on the line 5—5 of Fig. 4 and looking in the direction of the arrows;

Figs. 6, 7 and 8 are diagrammatic perspective views, illustrating respectively, the controls for the elevators, ailerons and rudders.

Fig. 10 is a vertical sectional view taken on the line 10—10 of Fig. 9 and looking in the direction of the arrows.

Figure 1:
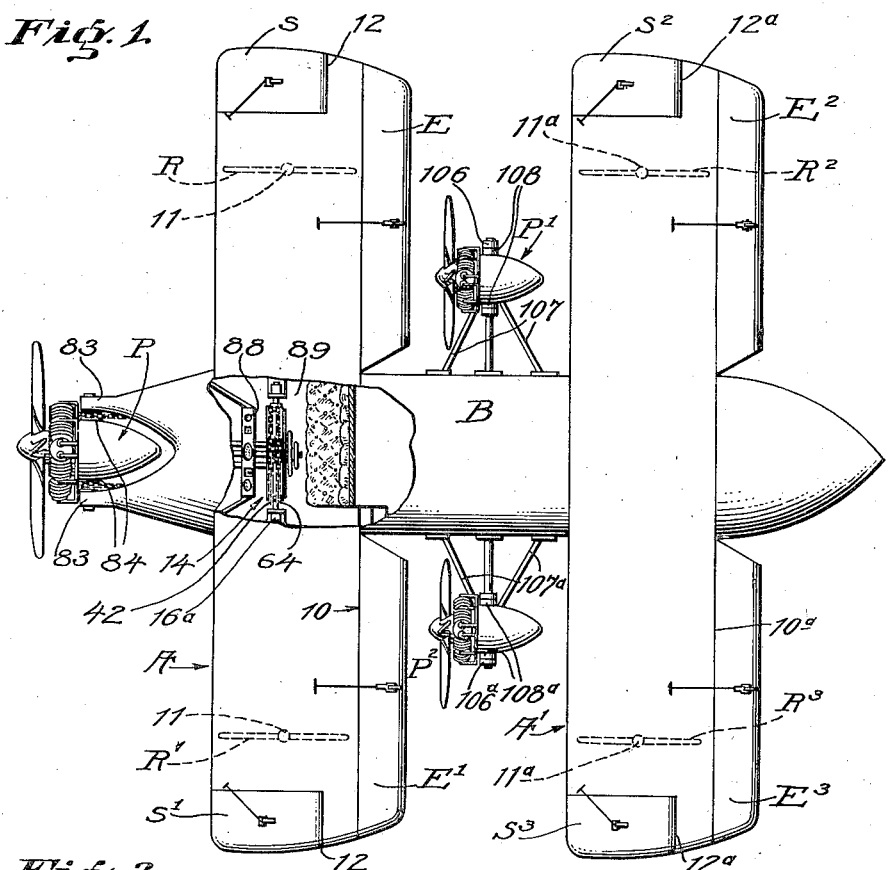
Fig. 1 is a view showing in plan, partly broken away, one form of aircraft embodying my invention.

Referring specifically to the drawings in which similar reference characters designate similar parts in each of the several views, my invention in its present embodiment is illustrated as comprising a body B in the form of an enclosed cabin for housing the pilot, passengers, freight, etc.; and from the body B are supported aerofoils A and A', the aerofoils extending transversely of the body from opposite sides thereof and being disposed one in advance of the other in spaced relation. The positions of the aerofoils along the length of the body are such as to render the craft inherently stable in a fore and aft direction and permit the usual tail assembly of a conventional airplane to be dispensed with, the usual flying control surfaces such as the elevator, rudder, and ailerons being embodied in the aerofoils A and A' and enabling the craft to be maneuvered and maintained on a desired course with the utmost ease and under perfect control of the pilot. Furthermore the provision of a plurality of aerofoils one in advance of the other permits the craft to function as a glider in the event that operation of the propelling means of the craft be discontinued, and it will be understood that a greater number of aerofoils than illustrated, could be used, depending in number on the area of supporting surface required for an aircraft of a given capacity.

The aerofoils A and A' are provided with the flying control surfaces of the craft, and in the present instance the aerofoils are provided respectively with pairs of elevators E, E', and $E^2$, $E^3$ hingedly connected to the respective aerofoils along the rear longitudinal edges thereof as indicated at 10 and $10^a$, and extending from the sides of the body B to the tips of the aerofoils, all as clearly shown in Fig. 1.

The aerofoils A and A' are further provided respectively with pairs of rudders R, R', and $R^2$, $R^3$, preferably of the balanced type and pivotally mounted immediately below the respective ailerons on vertical axes 11 and 11ª respectively, while the tips of the aerofoils are recessed from their leading edges rearwardly as indicated at 12 and 12ª to receive ailerons, the pair of ailerons for the aerofoil A being designated as S and S' and those of the aerofoil A' being designated at S² and S³. The pairs of ailerons are preferably of the balanced type and are pivotally mounted on their respective aerofoils on horizontal axes 13 and 13ª respectively.

The pairs of elevators, rudders, and ailerons above described are adapted to be manually actuated to control the direction of travel of the craft, by an operator within the body B, and to this end a control bridge is provided and comprises a U shaped frame 14 having a pair of vertical arms 15 and a horizontal connecting arm 16, the vertical arms being pivoted on brackets 16ª secured in the body B so that the frame can be rocked in a fore and aft direction relative to the craft. Connected to the arms 15 at opposite sides of their mountings in the brackets 16ª, are flexible cables 17, 18, 19, and 20 trained over suitable guide pulleys 21, the arrangement and location of which are such that the cables 17 and 18 will lead to the elevator E for connection respectively to the upper and lower horns 22 and 23 of the elevator, while the cables 19 and 20 will lead to the elevator E' for connection respectively to the upper and lower horns 24 and 25 of the latter elevator. Other cables 26, 27, 28, and 29 are connected at one of their ends to the cables 17, 18, 19, and 20 respectively, as indicated respectively at 26ª, 27ª, 28ª, and 29ª in Fig. 6 and are trained over suitable guide pulleys 30, the arrangement and location of which is such that the cables 26 and 27 will lead to the elevator E² for connection respectively to the upper and lower horns 31 and 32 of the latter, while the cables 28 and 29 will lead to the elevator E³ for connection respectively to the upper and lower horns 33 and 34 of the latter. With the various cables connected to the frame 14 and to the various elevators as above described, it will be clear that all the elevators will be simultaneously actuated and will be rocked downwardly or upwardly according as the frame is rocked forwardly or rearwardly, to accordingly cause the aircraft to lose or gain altitude when in flight as a result of the reaction of the air against the surfaces of the elevators.

Journaled in bearings 35 on the horizontal arm 16 of frame 14 is a stub shaft 36 having fixed thereto a handwheel 37 and a sprocket wheel 38 while telescopically receiving the shaft, and rotatably mounted thereon is a sleeve 39 having fixed thereto a sprocket wheel 40 and a handwheel 41 of larger diameter than the handwheel 37. Constantly meshing with the sprocket wheel 38 is a length of chain 42 trained over idler pulleys 43 rotatably mounted on the frame 14; and connected to one end of the chain is a flexible cable 44 trained over pulleys 45 so arranged and located that the cable will lead to the lower horn 46 of aileron S. To the other end of the chain 42 is connected a second flexible cable 47 trained over pulleys 48 and leading to the aileron S' for connection to the lower horn 49 of the latter, while a third cable 50, trained over pulleys 51, connects the upper horn 52 of the aileron S and the upper horn 53 of the aileron S'.

Other cables 54, 55, and 56 are provided, the cables 54 and 55 being trained over pulleys 58 and connected respectively at one of their ends to the cables 44 and 47 as indicated at 54ª and 55ª respectively, and at the other of their ends respectively to the lower horns 59 and 60 of the ailerons S² and S³ respectively, while the cable 56 is trained over pulleys 61 and connected at its ends to the upper horns 62 and 63 of the ailerons S² and S³ respectively. The ailerons S and S² will be thus caused to be elevated and the ailerons S' and S³ depressed or vice versa according as the handwheel 37 is rotated in a clockwise or counter-clockwise direction, as viewed in Fig. 4, to accordingly bank the aircraft to the right or left.

Constantly meshing with the sprocket wheel 40 is a length of chain 64 trained on idler pulleys 65 mounted on the frame 14, and to one end of the chain is connected a flexible cable 66 trained over idler pulleys 67 and connected to a rearwardly projecting horn 68 fixed to the axis of the rudder R, while to the other end of the chain is connected a flexible cable 69 trained over idler pulleys 70 and connected to a rearwardly projecting horn 71 fixed to the axis of the rudder R'. A third flexible cable 72 connects forwardly projecting horns 73 and 74 fixed respectively to the axes of the rudders R and R'. Other cables 75, 76, and 77 are provided, the cables 75 and 76 being trained over pulleys 78 and connected respectively at one of their ends to the cables 66 and 69 at the points indicated at 75ª and 76ª and at their other ends to forwardly projecting horns 79 and 80 fixed respectively to the axes of the rudders R² and R³, while the cable 77 connects rearwardly projecting horns 81 and 82 fixed to the axes of the rudders R² and R³ respectively. By this arrangement of cables all the rudders will be simultaneously actuated in response to rotation of the hand-wheel 41 to steer the aircraft to the right or left according as the handwheel is rotated in a clockwise or counterclockwise direction as viewed in Fig. 4.

For propelling the aircraft through the air a plurality of power plants having direct connected propellers are preferably provided, and in the present instance three are illustrated and designated at P, P', and P². The power plants are all mounted on the aircraft for such adjustment that the direction of thrust of their respective propellers when in operation can be varied to propel the aircraft either forwardly through the air; forwardly and upwardly through the air; or vertically upward through the air.

Figure 2:
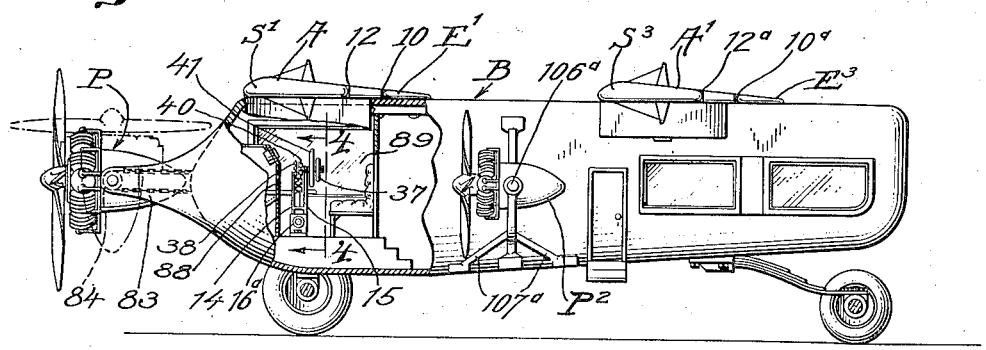
Fig. 2 is a view in side elevation, partly broken away, of the aircraft shown in Fig. 1.
Figure 8:
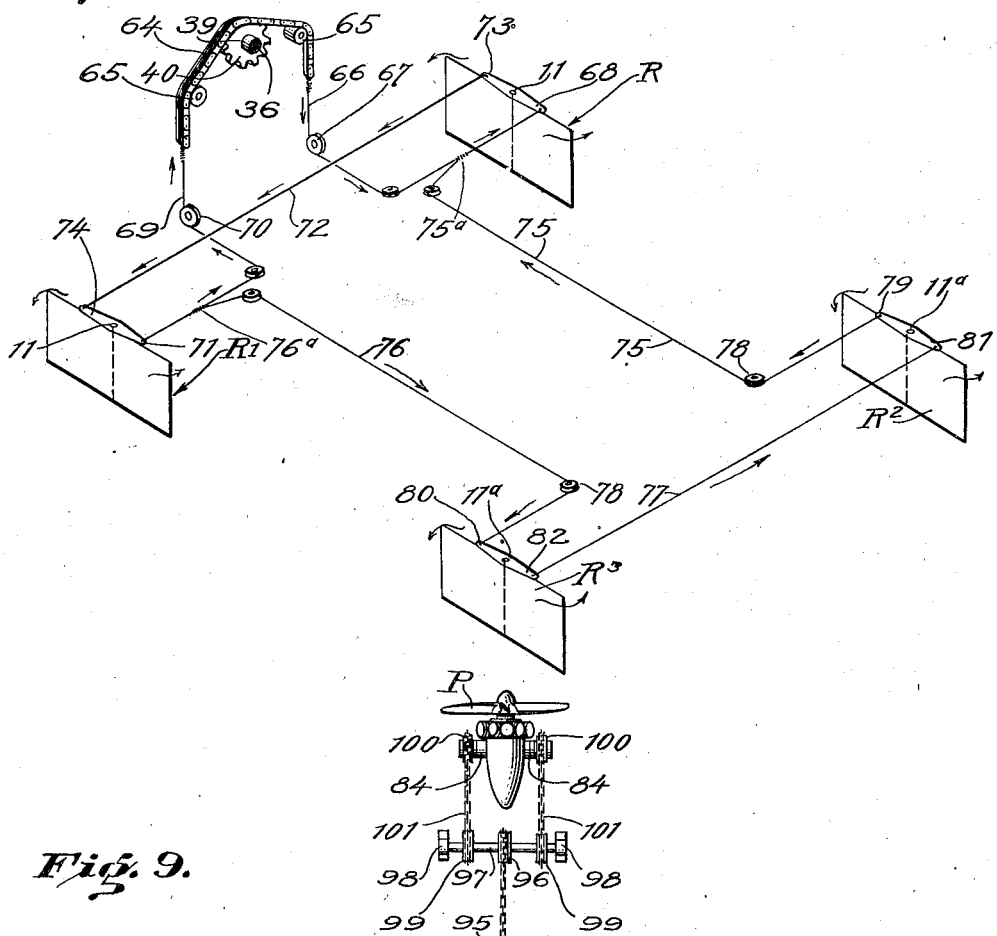
Figure 9:
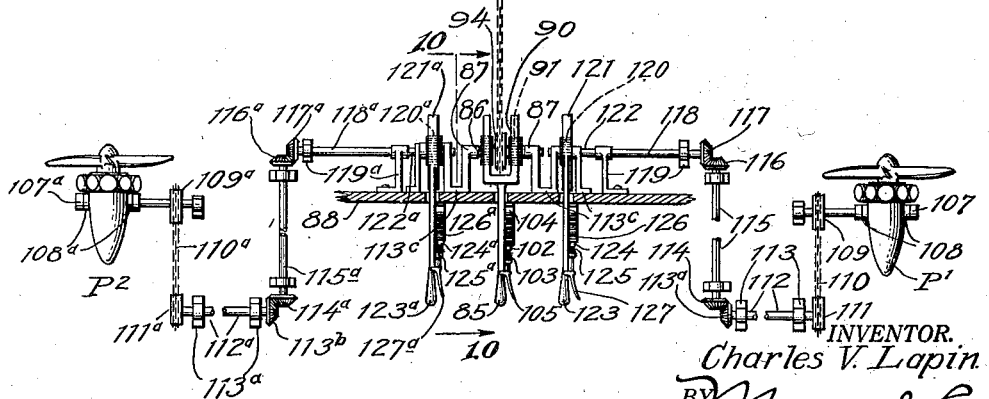
Fig. 9 is a diagrammatic plan view of the power plants and the mechanism for controlling them to vary the direction of the thrust exerted by their propellers.

To this end the forward extremity of the body B is provided with a yoke 83 in which the power plant P is mounted for pivotal movement by means of alined trunnions 84 carried by the power plant and journaled in the yoke. The power plant P is capable of being rotated manually from the full line position shown in Fig. 2 to the broken line position in this figure by means of a hand lever 85 secured to a shaft 86 journaled in brackets 87 in the body B and projecting rearwardly through the instrument board 88 into the cockpit 89 in advance of the operator's seat, an internal segmental gear 90 being fixed to the shaft 86 and constantly meshing with a pinion 91 fixed to a shaft 92 journaled in brackets 93 in the body. Also fixed to the shaft 92 is a sprocket wheel 94 over which is a chain 95, the chain being also trained over a second sprocket wheel 96 fixed to a shaft 97 journaled in brackets 98 supported in the body B to the rear of the yoke 83. Fixed to the shaft 97 at opposite sides of the sprocket wheel 96 are a pair of sprocket wheels 99 while a second pair of sprocket wheels 100 are fixed to the trunnions 84 and connected to the sprocket wheels 99 by chains 101. It will thus be clear that rocking movement of the lever 85 will cause rocking of the power plant P to vary the direction of thrust of its propeller. The power plant P is capable of being secured in any selected position of adjustment by means of a latching pawl 102 carried by the lever 85 and normally urged by a spring 103 into engagement with an arcuate rack 104 secured to the instrument board 88, an arm 105 being connected to the pawl for releasing the latter when the position of the power plant P is to be changed.

The power plant P' and P² are preferably mounted at opposite sides of the body B in the spaces between the aerofoils A and A', and as the means for mounting and actuating one of these power plants to vary the direction of thrust of its propeller is identical to that for the other power plant except for the fact that one is right hand and the other left hand, a description of one means will suffice for both, and to distinguish the numerals designating the parts of one means from those of the other, the numerals for the parts of one means are provided with exponents.

The power plant P' is mounted in a yoke 106 supported by a frame 107 from the body B, and the power plant is provided with trunnions 108 journaled in the yoke so that the power plant can be adjusted in the same manner as above described in connection with the power plant P. Fixed to one of the trunnions 108 is a sprocket wheel 109, over which is trained an endless chain 110 also trained over a second sprocket wheel 111 fixed to a shaft 112 journaled in the frame 107 and in a bracket 113 within the body B.

To the inner end of the shaft 112 is fixed a bevel gear 113 constantly meshing with a second bevel gear 114 fixed on one end of a shaft 115 extending forwardly of and at right angles to the shaft 112. To the forward end of the shaft 115 is fixed a bevel gear 116 constantly meshing with a second bevel gear 117 fixed to one end of a shaft 118 mounted in brackets 119 supported in the body B immediately in advance of the instrument board 88. To the other end of the shaft 118 is fixed a pinion 120 with which constantly meshes a segmental internal gear 121 fixed to a shaft 122 journaled in brackets 113.

Also fixed to the shaft 118 and projecting rearwardly through the instrument board 88 is an operating lever 123, and it will be clear that through the gear train and chain and sprocket mechanism just described, rocking movement of the lever will effect rocking movement of the power plant P' to vary the direction of thrust of its propeller. To secure the power plant P' in any selected adjusted position, a latching pawl 124 is carried by the lever 123 and is normally urged by a spring 125 into engagement with an arcuate rack 126 secured to the instrument board at one side of the operating lever for the power plant P. The pawl 124 is adapted to be disengaged from the rack 126 to permit adjustment of the power plant P' by means of an arm 127 carried by the lever 123 and connected to the pawl.

It will be manifest that by the provision of the foregoing mountings and actuating and locking mechanisms for the power plants P, P', and P², the power plants can be adjusted to vary the directions of thrust of their respective propellers independently of each other and locked in a selected position of adjustment, so that the propellers of the respective power plants can be positioned to propel the aircraft either forwardly, forwardly and upwardly or vertically upward, to the end that in combination with the arrangement of lifting and flying control surfaces previously described an inherently stable and easily maneuverable aircraft will be provided, which is capable of functioning as a glider in the event that operation of the power plants is discontinued, as well as being capable of relatively high forward speeds and of cruising slowly over an area and taking off from and landing in a restricted space.

Although I have herein shown and described only one form of aircraft embodying my invention, it is to be understood that various changes and modifications may be made therein without departing from the spirit of the invention and spirit and scope of the appended claims.

I claim:

1. In an aircraft, a power plant having a propeller, a yoke secured to the aircraft, trunnions carried by the power plant and mounted in the yoke to support the power plant for pivotal movement to vary the direction of thrust exerted by the propeller when in operation, means for moving the power plant and means for securing the power plant in a selected position of adjustment, said means for moving the power plant comprising a pinion rotatably mounted on a fixed axis, means for operatively connecting the pinion to at least one of the trunnions to rotate the latter in response to rotation of the pinion, and a segmental internal gear constantly meshing with the pinion.

2. In an aircraft, a power plant having a propeller, a yoke secured to the aircraft, trunnions carried by the power plant and mounted in the yoke to support the power plant for pivotal movement to vary the direction of thrust exerted by the propeller when in operation, means for moving the power plant, and means for securing the power plant in a selected position of adjustment, said means for moving the power plant comprising a pinion rotatably mounted on a fixed axis, means for operatively connecting the pinion to at least one of the trunnions to rotate the latter in response to rotation of the pinion, and a segmental internal gear constantly meshing with the pinion, and said means for securing the power plant in a selected position of adjustment comprising a hand lever secured to the segmental gear for actuating the latter, a stationary keeper, and a latch on the lever engageable with the keeper to latch the segmental gear against movement.

CHARLES V. LAPIN.